(No Model.)  2 Sheets—Sheet 1.
C. S. SHARP.
CORN HARVESTER.
No. 601,760.  Patented Apr. 5, 1898.
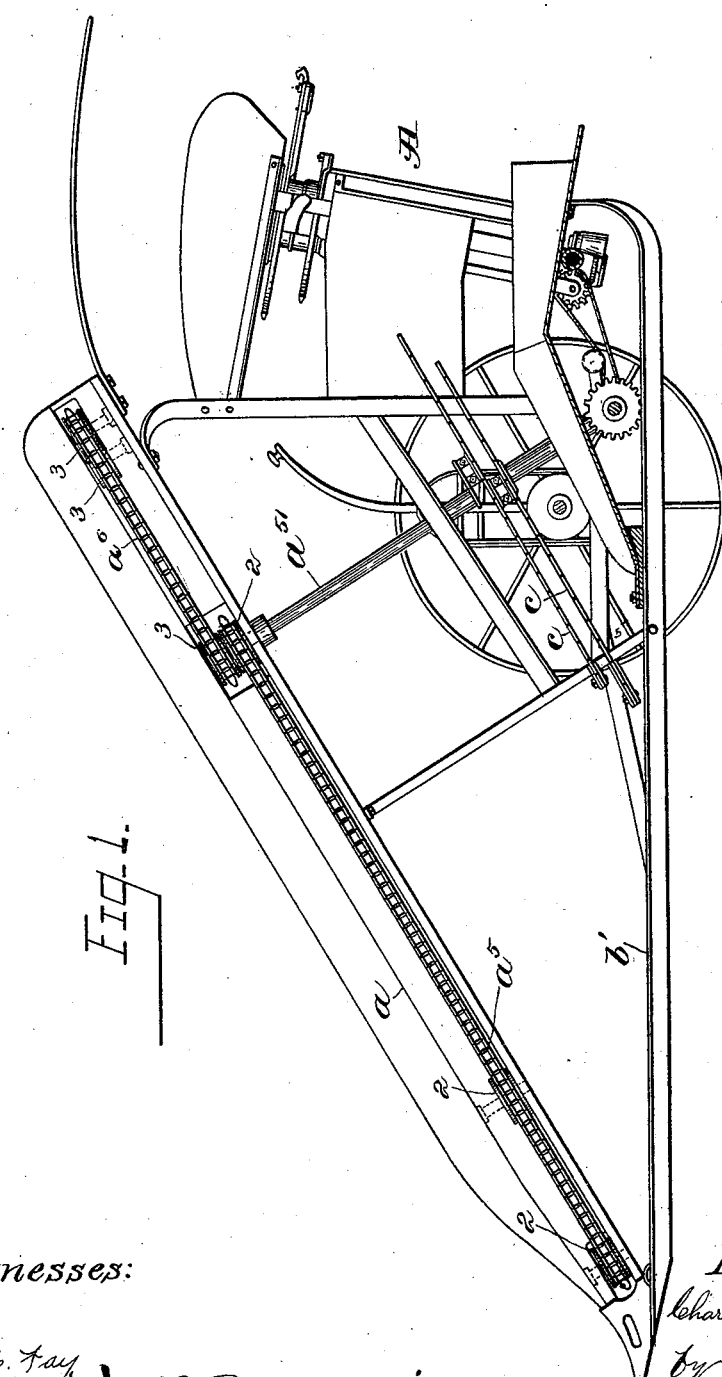
Witnesses:
A. E. Fay
Arthur L. Randall
Inventor:
Charles S. Sharp
by R. J. Hayes
Attorney.

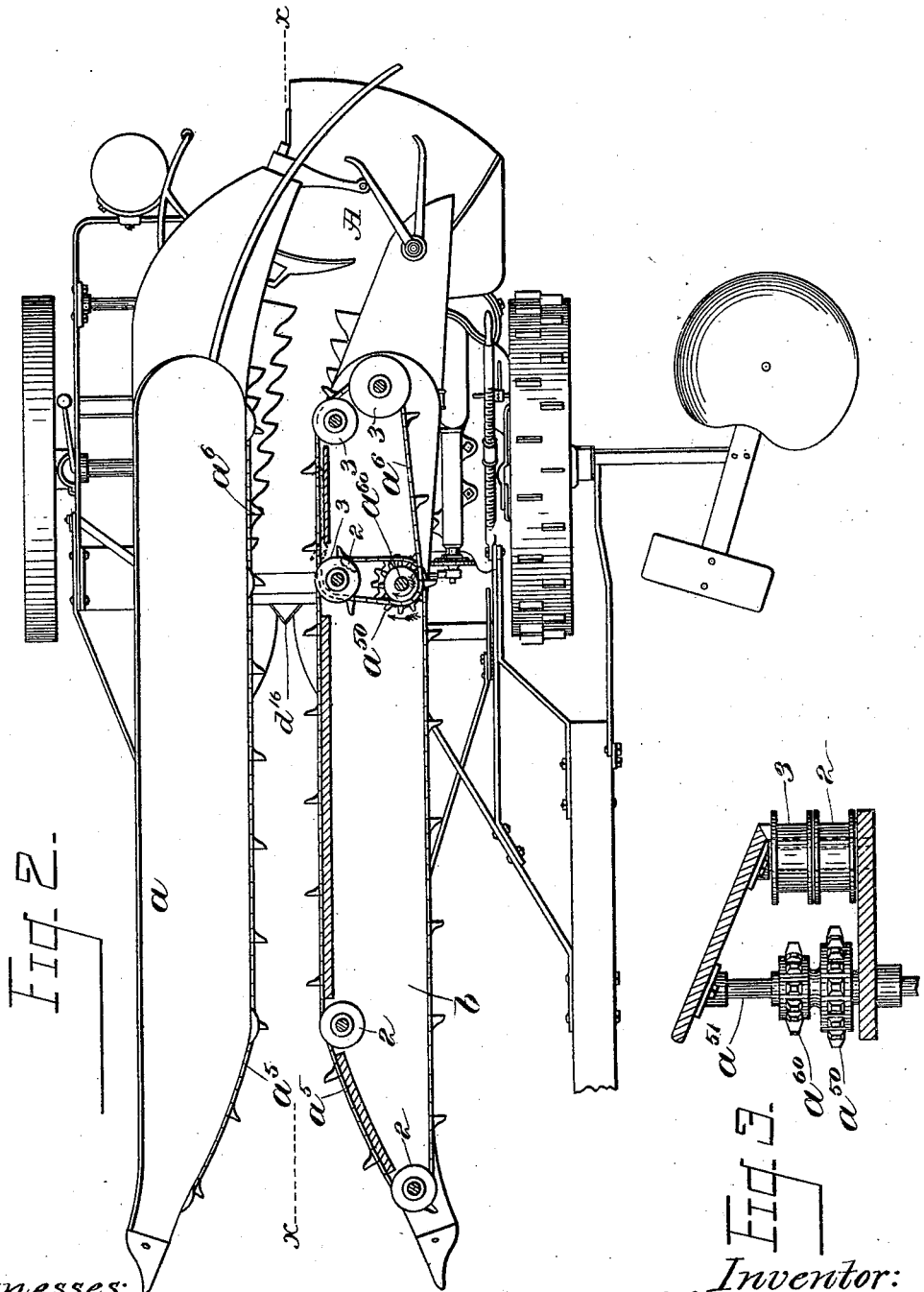

UNITED STATES PATENT OFFICE.

CHARLES S. SHARP, OF AUBURN, NEW YORK, ASSIGNOR TO THE D. M. OSBORNE & COMPANY, OF SAME PLACE.

CORN-HARVESTER.

SPECIFICATION forming part of Letters Patent No. 601,760, dated April 5, 1898.

Application filed January 20, 1897. Serial No. 619,959. (No model.)

*To all whom it may concern:*

Be it known that I, CHARLES S. SHARP, of Auburn, county of Cayuga, State of New York, have invented an Improvement in Corn-Harvesters, of which the following description, in connection with the accompanying drawings, is a specification, like letters and figures on the drawings representing like parts.

In corn-harvesters—such, for instance, as shown in United States Patent No. 539,830— the standing corn is cut and then conveyed to a suitable binder and bound "on end." In operating such a machine a serious difficulty is encountered in gathering the corn and presenting it to the cutter and then conveying it along the feed-passage and delivering it to the binder, owing to the fact that in the field the stalks will be found to occupy all sorts of positions, some of the stalks standing quite erect and others leaning in different directions, and as a consequence the stalks which enter the machine will be more or less promiscuously arranged. In practice it is desirable that the corn which enters the machine shall occupy a substantially upright position when presented to the cutter and that it shall be conveyed along the feed-passage to the binder in such upright position; and this invention has for its object to provide means for "righting" the leaning stalks of corn and after bringing them into upright position to convey them along in such upright position to the binder.

My invention comprehends means for gathering the promiscuously-arranged or more or less inclined stalks of corn and for bringing them into substantially upright position before presenting them to the cutter and means for feeding the severed corn along the corn-passage to the binder in such upright position.
In carrying out this part of my invention I may employ as a means of gathering and bringing the corn into upright position suitable devices which engage the corn and work rearwardly along the corn-passage approximately to the cutter, and said corn-engaging devices which thus gather and right the corn move quite rapidly in order that the leaning or recumbent stalks may be brought into erect position speedily, and I may employ as a means of feeding the severed corn along the corn-passage toward and preferably to the binder any suitable device which engages the upright corn and moves at a slower speed than the aforesaid rapidly-moving corn-engaging devices, to thus engage the severed corn in the upright position in which it has been brought by said rapidly-moving corn-engaging devices and to convey it rearwardly in such upright position.

The rapidly-moving corn-engaging devices which gather and right the corn may consist of chains having lateral projections which engage the corn, and the slowly-moving corn-engaging devices which feed along the severed corn may consist of similarly-constructed chains, and said rapidly and slowly moving corn-engaging chains will be arranged to work rearwardly along the laterally-confined corn-passage toward the binder, one at the rear of and in continuation of the other.

Arranged below and working in conjunction with the slowly-moving corn-engaging chain or chains which act upon or engage the stalks which are brought into upright position by the rapidly-moving corn-engaging devices in front of them I will employ suitable butt-feeding devices which will move at a speed corresponding to the speed of said slowly-moving corn-engaging devices.

The rapidly-moving corn-engaging devices will be arranged to work from the front end of the machine rearwardly toward and preferably to a point in a vertical plane with the cutter, after which the severed corn will be conveyed rearwardly by the slowly-moving corn-engaging devices, and by moving or working the front corn-engaging devices quite rapidly the corn will be brought into erect position early in its progress along the corn-passage and usually by the time it reaches the cutter.

The rapidly-moving corn-engaging devices are upwardly inclined from the front toward the rear and thus engage the corn near the butts at first, traveling upward as the machine advances, and owing to the elevation of the binder at the rear end of the machine the slowly-moving corn-engaging devices are also upwardly inclined. I find in practice that it is also desirable to grasp the corn and positively convey it along the corn-passage to the cutter and then while conveying it rearwardly from the cutter to the binder to less positively engage and convey it along, so as not to crowd the corn in the feed-passage in front of the binder, and I have herein accomplished this result by so constructing and arranging the corn-engaging chains that the engaging portions of the forward chains will be constantly drawn taut and the engaging portions of the rear chains will be held slack while the machine is in operation, and the taut chains will grasp the corn and positively convey it along to the cutter, and the slack chains will grasp the corn, but instead of positively feeding it along the teeth of said chains are permitted to turn backward, or toward the front of the machine, and hence slip by or over or along the corn when the corn begins to crowd in the feed-passage in front of the binder. The butt-feeding devices, which coöperate with said slack feeding-chains in conveying the severed corn from the cutter to the binder, reciprocate and have a movement toward and from each other, thus intermittingly engaging and moving along the corn, and by so disengaging the corn at repeated intervals they also, like the slack chains, prevent crowding the corn in the feed-passage.

My invention therefore also consists in devices for grasping the corn and positively conveying it rearwardly along the corn-passage to the cutter and yielding or laterally-movable devices for engaging the severed corn and moving it along the corn-passage to the binder, such yielding or laterally-movable corn-feeding devices operating to prevent the corn from crowding in the corn-passage by reason of not positively and continuously engaging and feeding it along. This part of my invention may be carried out without regard to the relative speed of any of the corn-engaging devices.

My invention is herein illustrated in connection with the corn-harvester shown in the patent aforesaid, but it is applicable to other corn-harvesters.

Figure 1 shows in longitudinal vertical section a corn-harvester embodying this invention; Fig. 2, a plan view of the corn-harvester shown in Fig. 1, the top board at one side of the corn-passage being removed; and Fig. 3, an enlarged sectional detail showing means for moving the corn-engaging devices which gather, right, and feed the corn.

The gathering-arms, consisting of the upwardly-inclined portions or top boards $a$ $b$ and the lower base portions $b'$, are suitably constructed and arranged to provide a passage-way or corn-passage extending rearwardly from the front end of the machine rearwardly to a binding mechanism A, which may be of any suitable or usual construction. A cutter $d^{16}$, of any suitable construction, is arranged at a point substantially midway the length of said corn-passage. Butt-feeding devices are provided, they being herein shown as reciprocating toothed plates or jaws $c$ $c$, which engage the butts of the corn just in front of the cutter and convey the corn rearwardly across said cutter toward and preferably to the binder. These parts, as well as others which it is not necessary to describe, may be substantially the same as in the patent referred to.

$a^5$ $a^5$ represent a pair of corn-engaging chains having lateral projections at intervals along their length and arranged in parallelism with the upwardly-inclined portions $a$ $b$, or substantially so, and extending from the front end of the corn-passage rearwardly for a considerable distance, terminating, as herein shown, adjacent to a vertical plane with the cutter. Each chain $a^5$ passes over and around idle-rolls 2 2 2 and around sprocket-wheels $a^{50}$, secured to upright operating-shafts $a^{51}$, which are rotated continuously by any suitable actuating mechanism. As the operating-shafts $a^{51}$ are rotated the two chains will be moved rearwardly along the corn-passage and will bring the corn into an upright position early in its progress along said passage and before presenting it to the cutter. These chains $a^5$ $a^5$ being upwardly inclined engage the corn near the butts and then travel up the stalks as the machine advances, and said chains move rearwardly quite rapidly, and consequently the stalks will be gathered up and brought into upright position speedily and early in their progress along the corn-passage. Hence said chains constitute corn-engaging devices which gather and right the corn, and as they move quite rapidly they will be referred to as "rapidly-moving corn-engaging devices." So far as this particular feature of my invention is concerned, however, I do not desire to limit myself to the employment of "chains," as it is obvious that other forms or constructions of devices may be employed in lieu of chains and the same results accomplished, and hence I desire it to be understood that my present invention includes any and all forms or constructions of corn-engaging devices working rapidly and rearwardly along the front part of the corn-passage which will bring the corn into substantially upright position for the action of the cutter when said devices are combined with more slowly-moving corn-engaging devices—such, for instance, as will now be described—for feeding rearwardly the severed corn in the upright position to which it has been brought by said rapidly-moving corn-engaging devices.

$a^6$ $a^6$ represent a pair of corn-engaging chains arranged substantially in parallelism with the upwardly-inclined portions $a$ $b$ and extending rearwardly from the termination of the corn-engaging chains $a^5$ $a^5$ to a point adjacent to the binding mechanism, and said corn-engaging chains $a^6$ $a^6$ each pass over and around idle-rolls 3 3 3 and around sprocket-wheels $a^{60}$, secured to the aforesaid operating-shafts $a^{51}$, and as said shafts are operated said corn-engaging chains $a^6$ $a^6$ will be moved rearwardly along the corn-passage and will engage the upright corn which is delivered to them by the corn-engaging chains $a^5\ a^5$ and will convey said corn in such upright position to the binding mechanism.

The sprocket-wheels $a^{60}$ are made considerably less in diameter than the sprocket-wheels $a^{50}$, and consequently the corn-engaging chains $a^6\ a^6$ will be moved at a slower speed than the corn-engaging chains $a^5\ a^5$, and this variation in speed is essential in order that the upright corn will be conveyed rearwardly along the corn-passage in substantially the same upright position as received from the corn-engaging chains $a^5\ a^5$.

The slowly-moving corn-engaging chains $a^6\ a^6$ extend from a point in substantially a vertical plane with the cutter to the binder, or thereabout, and they are elevated and engage the stalks of the corn some distance above the butts; but they work in conjunction with the aforesaid butt-feeding devices $c\ c$ in thus feeding rearwardly the severed corn. Hence said chains $a^6\ a^6$ constitute corn-engaging devices which feed along the corn, and as they move or work slowly as compared with the forward corn-engaging devices they will be referred to as "slowly-moving corn-engaging devices."

Although the upper slowly-moving corn-engaging devices are herein shown as chains, like the rapidly-moving corn-engaging devices, yet they may be otherwise constructed, if desired, and hence I desire it to be understood that any and all forms or constructions of corn-engaging devices when constructed and arranged to engage the corn in the corn-passage, which has been previously brought into a substantially upright position by other devices, and when operated to work rearwardly along the corn-passage at a slower speed than the devices which righted the corn come within the spirit and scope of this invention.

The two pairs of corn-engaging devices $a^5\ a^5$ and $a^6\ a^6$, which work one in front of the other, serve as and constitute two "sets" of corn-engaging devices, the front set gathering and righting the corn and the rear set feeding the righted corn rearwardly along the corn-passage.

As herein shown, the set of rapidly-moving corn-engaging devices represented by the rapidly-moving chains $a^5\ a^5$ terminates approximately in a vertical plane with the cutter, although preferably in front of the cutter, and the set of slowly-moving corn-engaging devices represented by the slowly-moving chains $a^6\ a^6$ begins at the termination of said rapidly-moving corn-engaging devices and extends rearwardly to a point adjacent to the binder, and in practice it is preferable to terminate the rapidly-moving corn-engaging devices at such point and also preferable to arrange the slowly-moving corn-engaging devices so as to act in continuation of said rapidly-moving corn-engaging devices.

The butt-feeding devices $c\ c$, which act upon the butts of the corn and which work in conjunction with the slowly-moving corn-engaging devices, also begin at or about a point in a vertical plane with the forward end of said slowly-moving corn-engaging devices and work along the corn-passage rearwardly toward the binder, and hence it will be seen that said butt-feeding devices will engage the butts of the corn just in advance of the cutter and will assist in presenting the corn to the cutter and that they will then act as feeding devices to feed along the severed corn.

As the butt-feeding devices $c\ c$ engage the corn in front of the cutter, and hence before the corn is cut, said devices should move rearwardly at a speed corresponding to the speed of the machine, so as to prevent pulling up the corn before or as it is being cut, and as the speed of said butt-feeding devices is thus determined the set of corn-engaging devices $a^6\ a^6$, which engage the stalks of the corn, will be moved rearwardly at substantially the same speed.

As herein shown, the engaging portions of the chains $a^5\ a^5$ are drawn taut by reason of the driving-wheel $a^{50}$ turning in the direction of the arrow thereon, and the engaging portions of the chains $a^6\ a^6$ are held slack by reason of the driving-wheel $a^{60}$ turning in the direction of the arrow thereon, and such construction enables the forward chains to positively engage and continuously move the corn along and enables the rear chains to engage and feed along the corn, but not positively and continuously like the forward chains, so that if the corn becomes crowded in the corn-passage the projecting fingers of said rear chains will yield rearwardly or turn backward in a direction toward the front of the machine, and as said fingers thus move rearwardly or yield they slip by or over or along the corn contained in the corn-passage, and hence do not crowd it. It will be understood that the projecting fingers of the chains are formed integral with the links thereof and by reason of the slackness of the chains said fingers are thus permitted to turn. In order that the results obtained by the use of such slack chains $a^6\ a^6$ may be effectually carried out—that is to say, that the corn may be less positively conveyed along the corn-passage—the butt-feeding devices $c\ c$, which work in conjunction with said slack chains, are also adapted to disengage the corn at intervals, they having a lateral movement which, it will be seen, is incidentally obtained by the particular manner herein shown of operating the butt-feeding devices—i. e., they move toward and from each other to engage, move along, and then disengage the corn. It will be understood that such yielding devices, which loosely engage the corn and which yield when the pressure becomes too great, obviate the necessity of providing a waiting-passage in front of the binder, and thus the machine can be somewhat shortened.

I claim—

1. In a corn-harvester, wherein the corn is gathered, cut and bound on end, a laterally-confined corn-passage, a binder at the rear end thereof, a cutter crossing said passage, a rapidly-moving corn-engaging device working rearwardly along the front part of said passage, and a slowly-moving corn-engaging device working rearwardly along the rear part of said passage in continuation of said rapidly-moving corn-engaging device, substantially as described.

2. In a corn-harvester, a laterally-confined corn-passage, a cutter, a rapidly-moving corn-engaging device working rearwardly along the front part of said passage approximately to a vertical plane with the cutter, and a slowly-moving corn-engaging device working along said corn-passage rearward of the cutter, substantially as described.

3. In a corn-harvester wherein the corn is gathered, cut and bound on end, a laterally-confined corn-passage, a binder at the rear end thereof, a cutter crossing said passage, two corn-engaging devices working rearwardly along said passage, one at the rear of the other, the rear one working at a slower speed than the one in front of it, and in continuation thereof, and a butt-engaging device arranged below said rear corn-engaging device, which works in conjunction therewith and at substantially the same speed, substantially as described.

4. In a corn-harvester, a laterally-confined corn-passage, a cutter and a binder, a rapidly-moving corn-engaging device working rearwardly along the front part of said passage approximately to the cutter, a slowly-moving corn-engaging device working rearwardly along said passage from the cutter toward the binder, and a butt-engaging device arranged below said slowly-moving corn-engaging device which works in conjunction therewith and at substantially the same speed, substantially as described.

5. In a corn-harvester, a laterally-confined corn-passage, a cutter and a binder, a rapidly-moving corn-engaging device working rearwardly along the front part of said passage approximately to the cutter, a slowly-moving corn-engaging device working rearwardly along said passage from a point in advance of the cutter toward the binder, and a butt-engaging device which works from a point in advance of the cutter rearwardly toward the binder and in conjunction with said slowly-moving corn-engaging device below which it is located, said slowly-moving corn-engaging device and butt-engaging device working at substantially the speed of the machine, substantially as described.

6. In a corn-harvester, a laterally-confined corn-passage, a pair of rapidly-moving upwardly-inclined corn-engaging chains working along the front part of said passage, a pair of slowly-moving upwardly-inclined corn-engaging chains working along the rear part of said passage in continuation of the aforesaid chains, substantially as described.

7. In a corn-harvester, a laterally-confined corn-passage, a pair of rapidly-moving upwardly-inclined chains working along the front part of said passage, a pair of slowly-moving upwardly-inclined corn-engaging chains working along said passage at the rear of the aforesaid chains, and in continuation thereof, and butt-feeding devices arranged below said slowly-moving corn-engaging chains which work in conjunction therewith, substantially as described.

8. In a corn-harvester, a laterally-confined corn-passage, and two corn-engaging chains working rearwardly along said passage, one in front of the other, the front chain traveling faster than the rear chain, and a single operating-shaft for said chains having thereon two driving-wheels of different diameters around which said chains pass, substantially as described.

9. In a corn-harvester, a laterally-confined corn-passage, a pair of rapidly-moving corn-engaging chains working along the front part of said passage, the engaging portions of which are drawn taut, and a pair of slowly-moving corn-engaging chains working along the rear part of said passage, the engaging portions of which are held slack, substantially as described.

10. In a corn-harvester, a laterally-confined corn-passage, a pair of rapidly-moving corn-engaging chains working along the front part of said passage, the engaging portions of which are drawn taut, and a pair of slowly-moving corn-engaging chains working along the rear part of said passage, the engaging portions of which are held slack, and reciprocating butt-feeding jaws located below said rear chains, and working conjunctively therewith to feed along the corn, substantially as described.

11. In a corn-harvester wherein the corn is gathered, cut and bound on end, a laterally-confined corn-passage, a cutter crossing said passage, a binder at the rear end of said passage, a floor along said passage from the cutter to the binder, devices for continuously engaging and positively moving the corn rearward and presenting it to the cutter, yielding stalk-feeding devices working in continuation thereof from the cutter rearward toward the binder, and one or more pairs of butt-feeding jaws located beneath said yielding stalk-feeding devices which work in conjunction therewith to engage the severed corn while resting upon the floor of said passage, and convey it rearward toward or to the binder, substantially as described.

In testimony whereof I have signed my name to this specification in the presence of two subscribing witnesses.

CHARLES S. SHARP.

Witnesses:
RAYMOND M. ATHERLY,
FRED. M. EVERITT.